United States Patent [19]

Wakamiya et al.

[11] Patent Number: 5,682,477
[45] Date of Patent: Oct. 28, 1997

[54] SYSTEM FOR SELECTING AN IMPLEMENTING CLASS HAVING CORRESPONDING PRESCRIBED RESOURCES MATCHING THE AVAILED RESOURCES AND CALCULATING COMPENSATING DATA TO BE STORED IN A MANAGEMENT TABLE

[75] Inventors: Kenji Wakamiya; Tetsuji Morishita, both of Kawasaki, Japan

[73] Assignee: Fujitsu Limited, Kawasaki, Japan

[21] Appl. No.: 238,065

[22] Filed: May 4, 1994

[30] Foreign Application Priority Data

May 27, 1993 [JP] Japan .................................. 5-126305

[51] Int. Cl.$^6$ ................................................ G06F 3/00
[52] U.S. Cl. ..................... 395/200.12; 395/200.13; 395/615; 364/464.01
[58] Field of Search ................. 364/464.1, 231.4, 364/231.6, 264, 281.3, 281.8; 395/200.09, 200.13

[56] References Cited

U.S. PATENT DOCUMENTS

| | | | |
|---|---|---|---|
| 3,870,866 | 3/1975 | Halpern | 379/144 |
| 3,999,685 | 12/1976 | Greenwood | 222/16 |
| 4,495,562 | 1/1985 | Yamaji et al. | 364/200 |
| 4,615,001 | 9/1986 | Hudgins, Jr. | 364/200 |
| 4,633,386 | 12/1986 | Terepin | 364/200 |
| 4,726,056 | 2/1988 | An et al. | 379/115 |
| 4,795,892 | 1/1989 | Gilmore et al. | 235/381 |
| 4,797,839 | 1/1989 | Powell | 364/554 |
| 4,827,508 | 5/1989 | Shear | 380/4 |
| 4,839,798 | 6/1989 | Eguchi et al. | 364/200 |
| 4,879,742 | 11/1989 | Taniguchi et al. | 379/111 |
| 4,918,595 | 4/1990 | Kahn et al. | 364/200 |
| 5,077,661 | 12/1991 | Jain et al. | 364/402 |
| 5,115,501 | 5/1992 | Kerr | 395/600 |
| 5,157,390 | 10/1992 | Yoshie et al. | 340/825.52 |
| 5,291,596 | 3/1994 | Mita | 395/600 |
| 5,303,369 | 4/1994 | Borcherding et al. | 395/650 |
| 5,325,525 | 6/1994 | Shan et al. | 395/650 |
| 5,341,477 | 8/1994 | Pitkin et al. | 395/200 |
| 5,408,663 | 4/1995 | Miller | 395/650 |
| 5,437,032 | 7/1995 | Wolf et al. | 395/650 |
| 5,528,677 | 6/1996 | Butler et al. | 379/196 |

*Primary Examiner*—Thomas C. Lee
*Assistant Examiner*—Anderson I. Chen
*Attorney, Agent, or Firm*—Staas & Halsey

[57] ABSTRACT

A service offering system of this invention comprises a service management table, a module drive section, an accounting compensating section and an accounting section. The service management table stores a service implementing class and a resources availed quantity per service. The module drive section allocates a prescribed resources quantity based on the implementing class of the service management table and drives a service module corresponding to the service. The module drive section stores the service management table with the resources availed quantity availed by the relevant service with the drive of the service module. The accounting compensating section checks whether or not the resources availed quantity stored in the service management table is matched with the prescribed resources quantity based on the implementing class and, if the resources availed quantity is not matched with the prescribed resources quantity, stores the service management table with compensation data for compensating an accounting quantity. The accounting section calculates the accounting quantity on the basis of the compensation data of the accounting quantity and the resources availed quantity stored in the service management table.

20 Claims, 13 Drawing Sheets

FIG.4

| CLASS | REACHING TIME | SIZE OF DOCUMENT | --- | BASIC CHARGE |
|---|---|---|---|---|
| A | UNDER 2 MIN. | UP TO 50 Kbyte | --- | 200 YEN |
| B | UNDER 5 MIN. | UP TO 30 Kbyte | --- | 100 YEN |
| C | UNDER 10 MIN. | UP TO 10 Kbyte | --- | 50 YEN |
| D | UNDER 10 MIN. | UP TO 10 Kbyte | --- | 30 YEN |

FIG.6

| |
|---|
| 1.. USER'S NAME |
| 2.. SERVICE NAME |
| 3.. CLASS SELECTION DATA |
| 4.. QUEUE INPUT DATA |

FIG.7

| USER'S NAME | MAIL TRANSMISSION | DOWN-LOADING | SHOPPING | --- |
|---|---|---|---|---|
| Paul | A | B | A | --- |
| Michael | C | B | C | --- |
| John | B | C | A | --- |
| Bill | D | D | D | --- |
| Jeff | A | A | D | --- |
| --- | --- | --- | --- | |

FIG.8

| PATTERN NAME | MAIL TRANSMISSION | DOWN-LOADING | SHOPPING | --- |
|---|---|---|---|---|
| FIRST | A | A | A | --- |
| BUSINESS | A | B | C | --- |
| ECONOMY | B | B | C | --- |
| GROUP EDUCTION | D | D | D | --- |
| --- | --- | --- | --- | --- |

FIG.13

| SERVICE ID | USER'S NAME | SERVICE NAME | IMPLEMENTING CLASS | PREVIOUS CLASS | RESOURCES AVAILING SITUATION |
|---|---|---|---|---|---|
| 3429 | Michael | MAIL TRANSMISSION | A | — | FIG. 15 |
| 4226 | Bill | SHOPPING | C | D | FIG. 15 |
| 4096 | Paul | MAIL TRANSMISSION | A | B | FIG. 15 |
| --- | --- | --- | --- | --- | --- |

FIG.15

| |
|---|
| CPU time |
| TIME FROM START OF SERVICE |
| DISK WRITE CAPACITY |
| DISK I/O QUANTITY |
| MEMORY CAPACITY |
| LINE USE QUANTITY |
| --- |
| END STATUS |

SYSTEM FOR SELECTING AN IMPLEMENTING CLASS HAVING CORRESPONDING PRESCRIBED RESOURCES MATCHING THE AVAILED RESOURCES AND CALCULATING COMPENSATING DATA TO BE STORED IN A MANAGEMENT TABLE

BACKGROUND OF THE INVENTION

The present invention relates to a system for and a method of offering services in response to requests for services.

In a service offering system, a client requesting the service is connected via a network to a server for offering the service. When the client requests the server to offer in the service offering system, the lines are connected by use of the network. The client is thus capable of availing the service and service resources offered from the server.

In this case, the server imposes a fixed amount of charge on all the clients, depending on a line connected time irrespective of a quality of the service offered and an availed quantity of the service resources. Further, in the conventional service offering system, there have hitherto been inputted services in excess of a system load in some cases. In this instance, the user could not receive the service of an expected level due to the overload on the system.

Even when the user can not receive the service of the expected level due to the system overload, however, an accounting quantity at that time is the same as that when the system load is light. In this case, a degree of satisfaction of the user is not necessarily agreeable to the accounting quantity. As a result, there arises a problem in which the service quality declines.

SUMMARY OF THE INVENTION

It is a primary object of the present invention to provide a system for and a method of offering services, which are capable of enhancing a service quality by making a degree of user's satisfaction agreeable to an accounting quantity and improving a processing efficiency of the system.

A service offering system of this invention offers services in response to requests for the services. The service offering system comprises indispensable constructive elements such as a storage section, a module drive section, an accounting compensating section and an accounting section. The storage section includes a service management table. The service management table stores a service implementing class and a resources availed quantity per service by making the implementing class and the resources availed quantity corresponding to each other. The module drive section allocates a prescribed resources quantity based on the implementing class of the service management table and, at the same time, drives a service module corresponding to the service. The module drive section stores the service management table with the resources availed quantity availed by the relevant service with the drive of the service module.

The accounting compensating section checks whether or not the resources availed quantity stored in the service management table is matched with the prescribed resources quantity based on the implementing class and, if the resources availed quantity is not matched with the prescribed resources quantity, stores the service management table with compensation data for compensating an accounting quantity. The accounting section calculates the accounting quantity on the basis of the compensation data of the accounting quantity and the resources availed quantity stored in the service management table.

Further, the module drive section creates service entries in the service management table. The module drive section drives the service module corresponding to the service entry in accordance with the implementing class and may add, to the service entry, the resources availed quantity availed by the relevant service with the drive of the service module.

The accounting compensating section, if the resources availed quantity is not matched with the prescribed resources quantity based on the implementing class, selects an implementing class corresponding to the prescribed resources quantity matched with the resources availed quantity. The accounting compensating section may rewrite the implementing class in the service management table to the implementing class corresponding to the prescribed resources quantity matched with the resources availed quantity In addition to the above indispensable constructive elements, there may be further provided a storage section including a user class database as a first added constructive element. The user class database holds a default subscriber class selected per service when a user becomes a subscriber.

In addition to the first added constructive element, there may be further provided a storage section including a class pattern table and a setting section as second added constructive elements. The class pattern table holds some recommended patterns in which proper subscriber classes are allocated to the respective services. The setting section sets the subscriber class of each service by selecting any one of the recommended patterns held by the class pattern table.

In addition to the first added constructive element, there may be further provided a change accepting section as a third added constructive element. The change accepting module works such that the user makes an on-line change of the subscriber class of user's own after becoming the subscriber of the service offering system.

In addition to the above indispensable constructive elements, there may be further provided a class selecting section as a fourth added constructive element. The class selecting section inquires of the user about an implementing class for the relevant service before implementing the service and selects the implementing class in accordance with a result of inquiring of the user per service request.

In addition to the above indispensable constructive elements, there may be further provided a class adjusting section as a fifth added constructive element. The class adjusting section adjusts the implementing class of the service which is being implemented depending on whether a system load is light or heavy.

In addition to the above indispensable constructive elements, there may be further provided a system checking section as a sixth added constructive element. The system checking section checks whether or not the relevant service is implementable by collating the requested service with system load data.

In addition to the sixth added constructive element, there may be further provided a service queue as a seventh added constructive element. The service queue inputs, if the implementation of the service is rejected, the relevant service into the module drive section when there is some unoccupied capacity in the system load by putting the service request into a queue.

In addition to the seventh added constructive element, there may be further provided an allowable quantity holding section and a class adjusting section. The allowable quantity holding section calculates and holds a service allowable quantity on the basis of present system load data and a subscriber class allocating situation. The class adjusting section enables an implementation of the service on the basis of the held service allowable quantity and adjusts a class of the service which is being implemented.

Moreover, a service offering method of the present invention offers services in response to requests for the services. The service offering method comprises a storing step, a module driving step, an accounting compensating step and an accounting step.

The storing step involves storing a service management table with a service implementing class and a resources availed quantity per service by making the implementing class and the resources availed quantity corresponding to each other. The module driving step involves allocating a prescribed resources quantity based on the implementing class and, at the same time, driving a service module corresponding to the service. The module driving step also involves storing the service management table with the resources availed quantity availed by the relevant service with the drive of the service module.

The accounting compensating step involves checking whether or not the stored resources availed quantity is matched with the prescribed resources quantity based on the implementing class and, if the resources availed quantity is not matched with the prescribed resources quantity, storing the service management table with compensation data for compensating an accounting quantity. The accounting step involves calculating the accounting quantity on the basis of the compensation data of the accounting quantity and the stored resources availed quantity.

According to the service offering system of the present invention, the module drive section drives the service module corresponding to the service while allocating the prescribed resources quantity based on the implementing class in the service management table. For this reason, a much larger prescribed resources quantity is allocated to a higher-order implementing class. Then, the module drive section, for a duration of the drive of the service module, stores the service management table with the resources availed quantity of the relevant service as occasion demands.

When finishing the implementation of the service, the accounting compensating section checks whether or not the resources availed quantity stored in the service management table is matched with the prescribed resources quantity based on the implementing class. If the resources availed quantity is not matched with the prescribed resources quantity based on the implementing class, the accounting compensating section stores the service management table with the compensating data for compensating the accounting quantity. Next, the accounting section calculates the accounting quantity on the basis of the compensating data of the accounting quantity and the resources availed quantity stored in the service management table.

That is, the allocated prescribed resources quantity changes depending on the implementing class of the service, and, therefore, it is possible to offer the service corresponding to the level demanded by the user. Further, if the resources availed quantity is not matched with the prescribed resources quantity based on the implementing class, the accounting quantity is compensated. It is therefore feasible to make the degree of satisfaction of the user agreeable to the accounting quantity.

Moreover, the user class database holds the subscriber class per service of each user, and, hence, the service requested by the user can be automatically implemented in the subscriber class of the relevant service.

Furthermore, the class pattern table is prepared with some recommended patterns in which the proper classes are allocated to the respective services. In this case, a pattern fitting to a liking of user's own and an application is, when affiliated, selected from the class pattern table. The subscriber class of each service is thereby automatically set. Accordingly, the user does not have to designate the class for each single service.

The change accepting module accepts a request for changing the subscriber class set by the affiliated user and makes a request for implementing the service as a special one. If the resources of the whole system permit, the user class database is updated with the drive of the service module, and the subscriber class is changed.

Further, when the user designates an implementing class in a certain service request, the class selecting section, when requesting the service, selects the implementing class on the basis of a result of inquiring of the user.

The class adjusting section obtains the system load data. The class adjusting section, when the load is light, retrieves the service which is being implemented in a low-order class from the service management table. The class adjusting section temporarily raises the implementing class of the service concerned. The module drive section temporarily augments the prescribed resources quantity allocated to the service according to the class thereof. Consequently, the futile unoccupied resources can be reduced.

The system checking section obtains the present system load data before implementing the service. The system checking section estimates whether or not the system is brought into an overload state because of implementing the service concerned. Then, when estimating that the system comes to the overload, the implementation of that service is rejected. The minimum service quality can be thereby maintained.

BRIEF DESCRIPTION OF THE DRAWINGS

Other objects and advantages of the present invention will become apparent during the following discussion in conjunction with the accompanying drawing 5, in which:

FIG. 4 is a diagram showing one example of a charge table for an electronic mail transmission service;

FIG. 6 is a diagram showing one example of contents of service requests;

FIG. 7 is a diagram showing one example of a user class database;

FIG. 8 is a diagram showing one example of a class pattern table;

FIG. 13 is a diagram showing one example of a service management table;

FIG. 15 is a diagram showing one example of a resources availing situation field in the service management table;

DETAILED DESCRIPTION OF THE PREFERRED EMBODIMENTS

Specific embodiments of the present invention will hereinafter be described.

<Embodiment 1>

Figure 1:
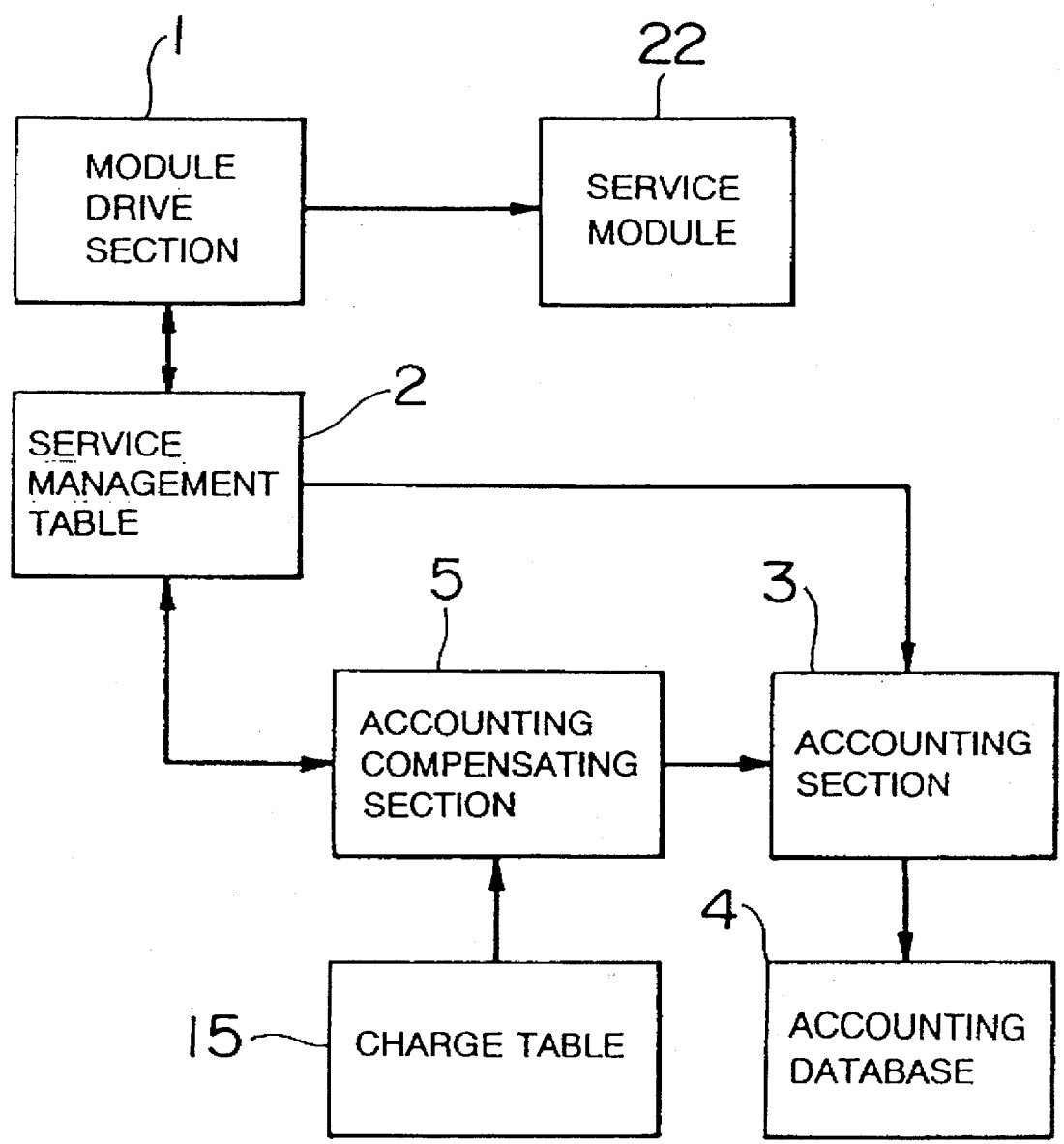
FIG. 1 is a block diagram illustrating a construction of a service offering system in accordance with an embodiment 1 of this invention.

FIG. 1 is a block diagram illustrating a construction of a service offering system in accordance with an embodiment 1. The service offering system offers services in response to a request for services via a network. The service offering system checks whether or not a quality of level demanded by the user is, after implementing a service, satisfied based on a resources availed quantity availed by this service.

The service offering system comprises a service management table 2, a module drive section 1, an accounting compensating section 5 and an accounting section 3. The service offering system also comprises a service module 22, a charge table 15 and an accounting database 4.

The service management table 2 is provided on, e.g., a magnetic disk. The service management table 2 manages the service while making a service implementing class corresponding to a resources availed quantity per service. Connected to the service management table 2 are the module drive section 1, the accounting compensating section 5 and the accounting section 3. The module drive section 1 allocates a prescribed resources quantity based on the implementing class of the service management table 2 and, at the same time, drives the service module 22 corresponding to the service. The module drive section 1 drives the service module 22, whereby the service management table 2 stores the resources availed quantity availed by the service concerned.

Herein, the service module implies one of areas into which the service is divided according to the functional units. The module drive section 1 creates a service entry for the service management table 2. The module drive section 1 drives the service module corresponding to the service entry in accordance with the implementing class. With this drive of the service module, the resources availed quantity availed by the service concerned is added to the service entry.

The accounting compensating section 5 checks whether or not the resources availed quantity stored in the service management table 2 is matched with the prescribed resources quantity based on the implementing class. If the resources availed quantity is not matched with the prescribed resources quantity, pieces of compensation data for compensating an accounting quantity are stored in the service management table 2. The accounting compensating section 5, if a result of implementing the service is not matched with the implementing class, reduces the accounting quantity.

Note that the accounting compensating section 5, if the resources availed quantity is not matched with the prescribed resources quantity based on the implementing class, selects an implementing class corresponding to the prescribed resources quantity matched with that resources availed quantity. The accounting compensating section 5 may rewrite the implementing class within the service management table 2 to an implementing class corresponding to the prescribed resources quantity matched with the resources availed quantity.

The accounting section 3 calculates an accounting quantity on the basis of the compensation data about the accounting quantity as well as about the resources availed quantity stored in the service management table 2.

The accounting database 4 stores the accounting quantity calculated by the accounting section 3. The charge table 15 is connected to the accounting compensating section 5. The charge table 15 stores the respective classes, the prescribed resources quantities based on the implementing classes and the charges by making these items corresponding to each other.

Figure 2:
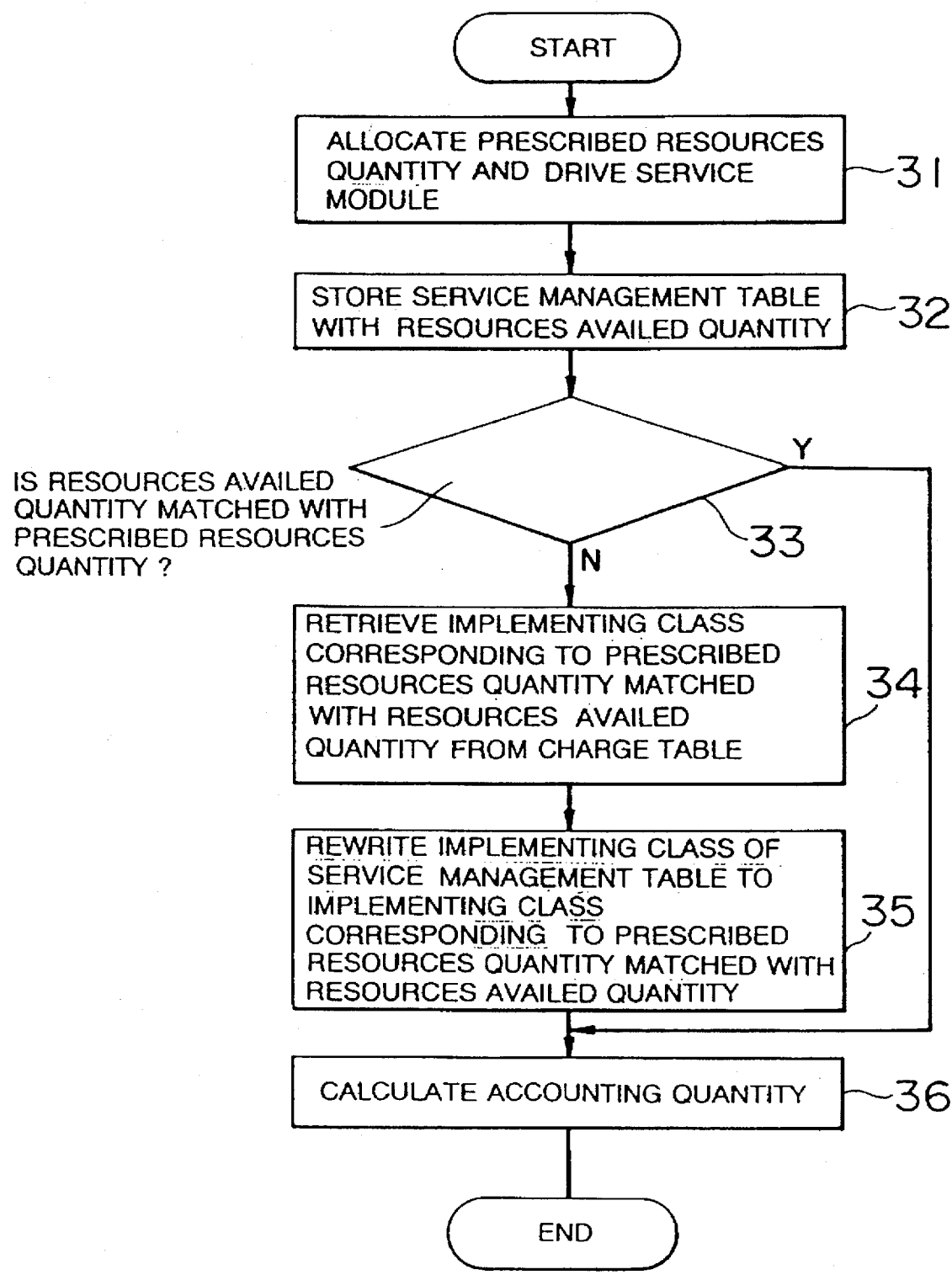
FIG. 2 is a flowchart showing a service offering method in accordance with the embodiment 1 of this invention.

FIG. 2 is a flowchart showing a method of offering services in accordance with the embodiment 1 of this invention. The service offering method in accordance with the embodiment 1 will be explained. First, the module drive section 1 drives the service module 22 corresponding to the service while allocating the prescribed resources quantity based on the implementing class of the service management table 2 (step 31). Next, the module drive section 1 stores the service management table 2 with a resources availed quantity availed by that service with the drive of the service module 22 (step 32).

Subsequently, the accounting compensating section 5 checks whether or not the resources availed quantity stored in the service management table 2 is matched with the prescribed resources quantity based on the implementing class (step 33). The accounting compensating section 5, if not matched with the prescribed resources quantity, selects an implementing class corresponding to the prescribed resources quantity matched with the resources availed quantity from the charge table 15 (step 34). The accounting compensating section 5 rewrites the implementing class in the service management table 2 to an implementing class corresponding to the prescribed resources quantity matched with the resources availed quantity (step 35).

The accounting section 3 calculates an accounting quantity on the basis of compensation data of the accounting quantity and the resources availed quantity stored in the service management table 2 (step 36).

As discussed above, according to the embodiment 1, the prescribed resources quantity and a ratio of accounting that are allocated according to the service implementing classes vary, and, therefore, it is possible to offer the services corresponding to the levels demanded by the respective users. Further, if the resources availed quantity is not matched with the prescribed resources quantity based on the implementing class, there is made a compensation for the accounting quantity. Hence, a degree of satisfaction of the user may be agreeable to the accounting quantity.

<Embodiment 2>

Figure 3:
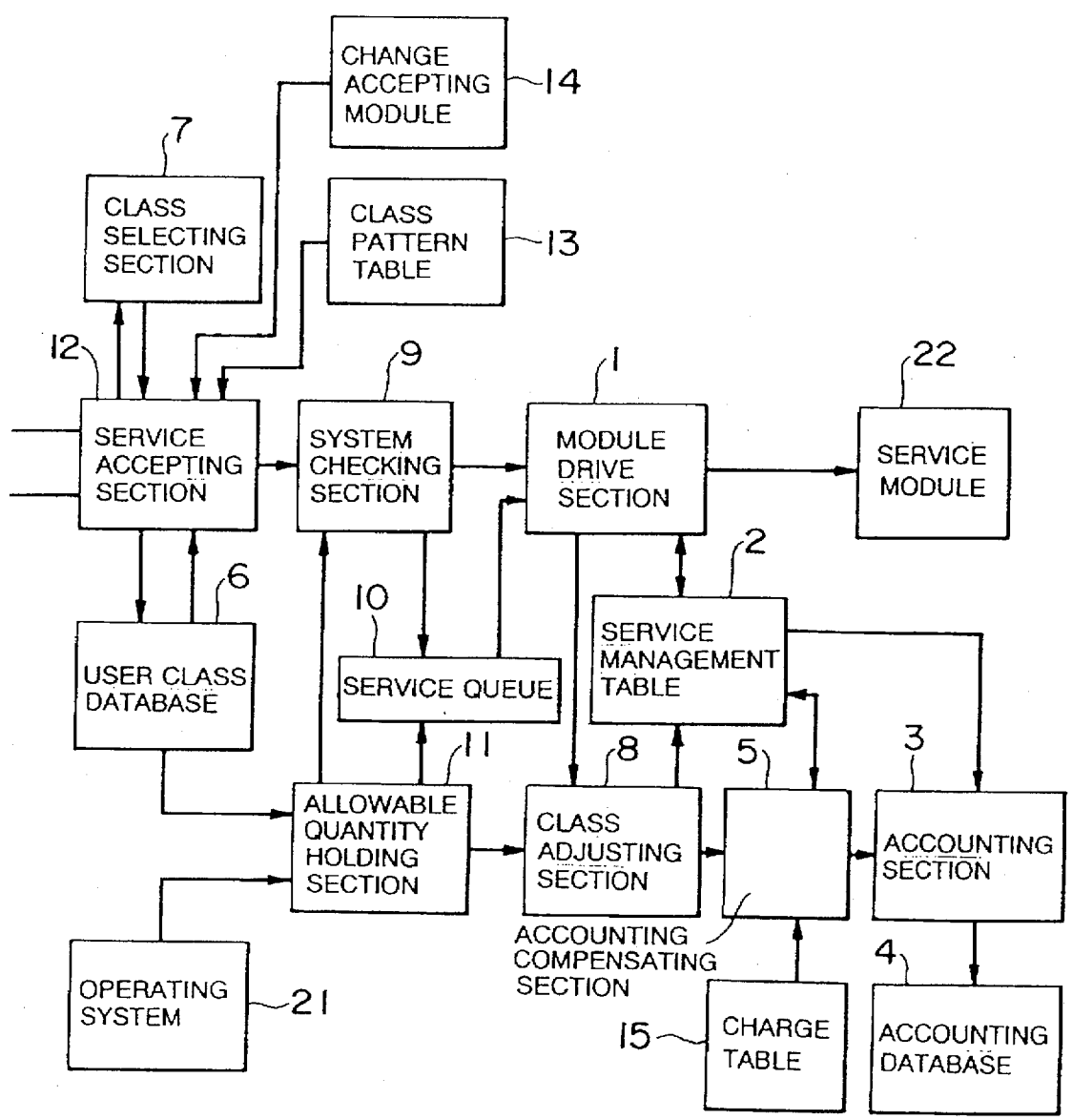
FIG. 3 is a block diagram illustrating a construction of the service offering system in accordance with an embodiment 2 of this invention.

FIG. 3 is a block diagram illustrating a construction of the service offering system in accordance with an embodiment 2 of the present invention. The service offering system comprises a service accepting section 12, a user class database 6, a class selecting section 7, a class pattern table 13 and a change accepting module 14.

Referring to FIG. 3, the service accepting section 12 accepts a request for a service from a client to a server via a local area network (hereinafter abbreviated to LAN) or a line. Connected to the service request accepting section 12 are the user class database 6, the class selecting section 7, the class pattern table 13 and the change accepting module 14.

The user class database 6 is provided on, e.g., a magnetic disk. The user class database 6 holds an implementing class of a default selected when the user becomes a subscriber of the service offering system. The class selecting section 7 inquires of the user as to an implementing class for that service before implementing the service. The class selecting section 7 then selects the implementing class for the user per the service request. The class selecting section 7 is employed especially when the user designates a certain service implementing class with a limit to its implementation.

The class pattern table 13 is provided on, e.g., a magnetic disk. For simplifying a user's operation of designating the classes one by one for every service, the class pattern table 13 holds some recommended patterns in which proper classes are allocated to the respective services. The service accepting section 12 sets a subscriber class of each service simply by selecting the recommended pattern in the class pattern table 13. The change accepting module 14 works such that the user makes an on-line change of the user's subscriber class after becoming subscriber of the service offering system.

The service offering system comprises an allowable quantity holding section 11, an operating system 21, a class adjusting section 8, a system checking section 9 and a service queue 10.

The allowable quantity holding section 11 is connected to the user class database 6. The allowable quantity holding section 11 calculates a resources quantity to be secured for implementing the service in a posterior high-order class on the basis of a present system load inputted as the occasion demands from the operating system 21. The allowable quantity holding section 11 holds the thus calculated resources quantity as a logical service allowable quantity. The allowable quantity holding section 11 may calculate and hold a logical service allowable quantity on the basis of the present system load and a subscriber class allocating situation. The allowable quantity holding section 11 outputs the service allowable quantity in the form of system load data to the class adjusting section 8, the system checking section 9 and the service queue 10.

The system checking section 9 is connected to the service accepting section 12. The system checking section 9 collates a requested service with the system load data and thus checks whether this service is implementable or not. If it can be estimated that a service requested to be implemented from the service accepting section 12 will exert an adverse influence on in-implementation services of other users in terms of the system load, the system checking section 9 rejects an implementation of the service requested to be implemented from the service accepting section 12. The service queue 10 is connected to the system checking section 9 and the allowable quantity holding section 11.

The service queue 10 is provided with a queue for storing the service requests, the implementations of which are rejected by the system checking section 9. The service queue 10 obtains the system load data from the allowable quantity holding section 11 at any time. The service queue 10 outputs the service request to the module drive section 1 immediately when there is some unoccupied capacity in the system load in order to implement the service requests accumulated in the queue.

The class adjusting section 8 is connected to the allowable quantity holding section 11. The class adjusting section 8 adjusts an in-implementation service implementing class according to a magnitude of the system load. The class adjusting section 8, when the system load is light, temporarily raises the service implementing class which is being implemented in a low-order class. Connected to the class adjusting section 8 are the module drive section 1, the service management table 2 and the accounting compensating section 5.

Further, the network service system comprises the accounting section 3, the service module 22, the change table 15 and the accounting database 4.

An accounting system is prepared for every service. For instance, when the service is classified as a electronic mail transmission service, an accounting system shown in FIG. 4 may be contemplated. The charge table 15, as illustrated in FIG. 4, stores an electronic mail reaching time, a guaranteed quality of a document size and a minimum charge that are allocated per class. After implementing a service, whether or not the quality thereof is satisfied is checked based on the resources availed quantity availed by this service.

Note that the same elements in the embodiment 2 as those in the embodiment 1 are constructed the same and therefore marked with the like symbols.

<Operation of Embodiment 2>

Figure 5:
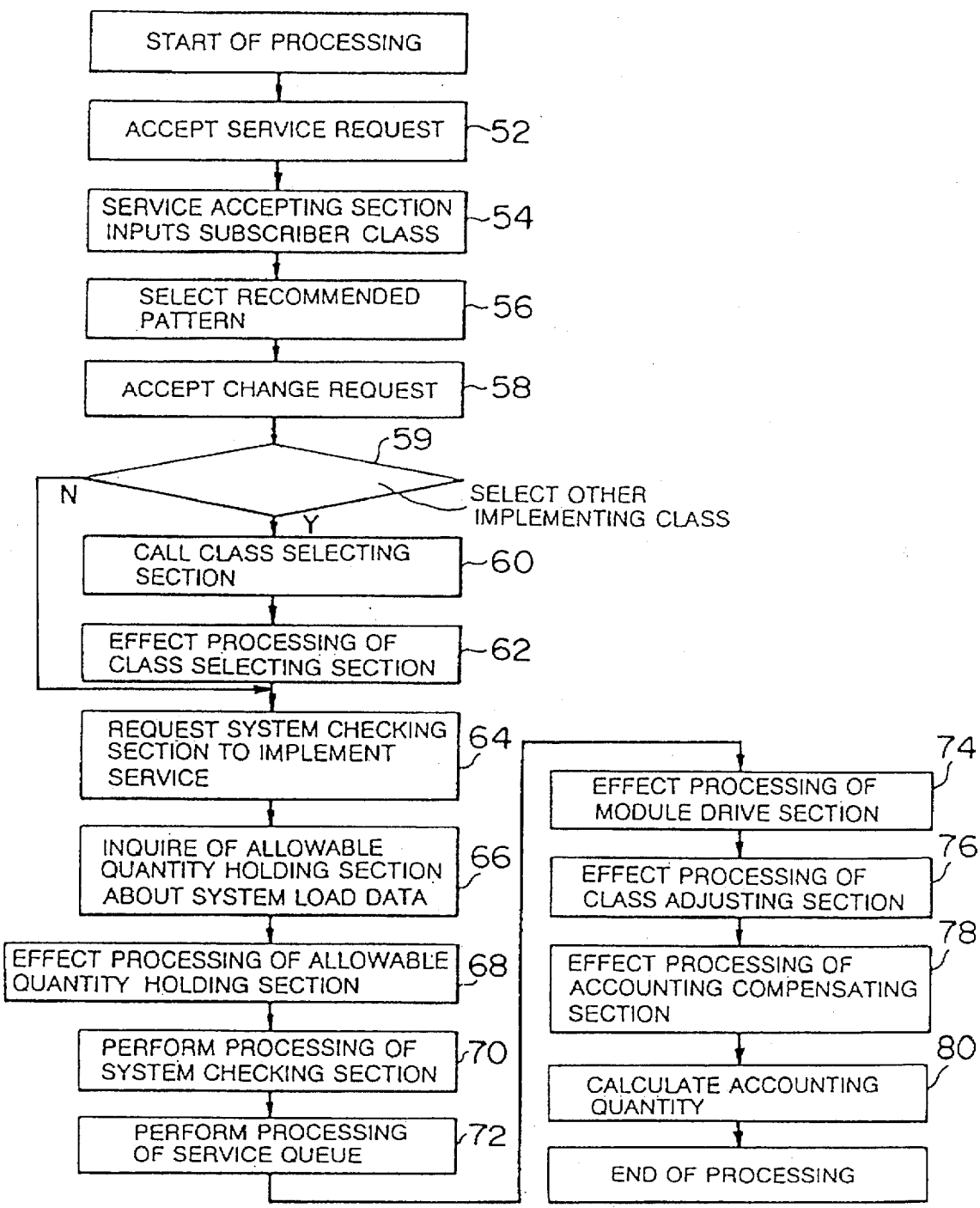
FIG. 5 is a flowchart showing the service offering method in accordance with the embodiment 2 of this invention.

Next, with reference to the drawings, an explanation of the operation of the embodiment 2 will start with a point of time when a service request is given. FIG. 5 is a flowchart showing the service offering method in accordance with the embodiment 2 of this invention.

To begin with, a service request from an unillustrated client to a server is accepted to the service accepting section 12 via the LAN or the line (step 52).

For example, as illustrated in FIG. 6, the service accepting section 12 accepts service request contents such as a user's name, a service name, class selection data indicating whether or not the implementing class is selected, and queue input data indicating whether to enter the service queue 10.

Next, the service accepting section 12 retrieves the user class database 6 shown in FIG. 7 on the basis of the requesting user's name and the requested service name shown in FIG. 6, thereby obtaining a service subscriber class corresponding to the user. The service accepting section 12 holds the subscriber class as a service implementing class (step 54).

For instance, in an example shown in FIG. 7, the services are mail transmission, down-loading and shopping. Supposing that the user's name is Paul, the mail transmission is of a class A; the down-loading is of a class B; and the shopping is of the class A. Set at this time in the user class database 6 are the classes allocated to the respective services when the user becomes a subscriber.

Thus, the user class database 6 holds the subscriber class per service of each user. The service requested by the user can be thereby automatically implemented in the subscriber class of that service.

Next, the service accepting section 12 selects a defined recommended pattern from the class pattern table 13 illustrated in FIG. 8 (step 56). For example, the pattern names are a first pattern, a business pattern, an economy pattern and a group pattern. In the case of the economy pattern, the mail transmission is the class B; the down-loading is the class B; and the shopping is a class C.

That is, pattern mapping is set in a user's entry of the user class database 6 by use of the class pattern table 13 without the user setting the subscriber classes one by one for every service.

As described above, the class pattern table 13 is prepared with some recommended patterns in which the proper classes are allocated to the respective services. The user who feels it troublesome to designate the class for each single service only selects a pattern fitting to a liking of user's own and application when affiliated. Thus, the subscriber class of each service is automatically set.

The change accepting module 14 managed by the service accepting section 12 accepts a request for changing the subscriber class from the user. The change accepting module 14 requests the system checking section 9 of an execution to actuate the service module 22 corresponding to the change of the subscriber class (step 58).

Herein, if the user class database 6 is not yet in a saturated status, i.e., if not full of the high-order classes, the system checking section 9 executes the service module 22. The user class database 6 is updated by driving the service module 22, whereby the subscriber class is changed.

On the other hand, if the user designates a selection of an implementing class different from the subscriber class (step 59) in accordance with the class selecting data shown in FIG. 6 on the occasion of making the service request, the service accepting section 12 calls the class selecting section 7 (step 60).

Figure 9:
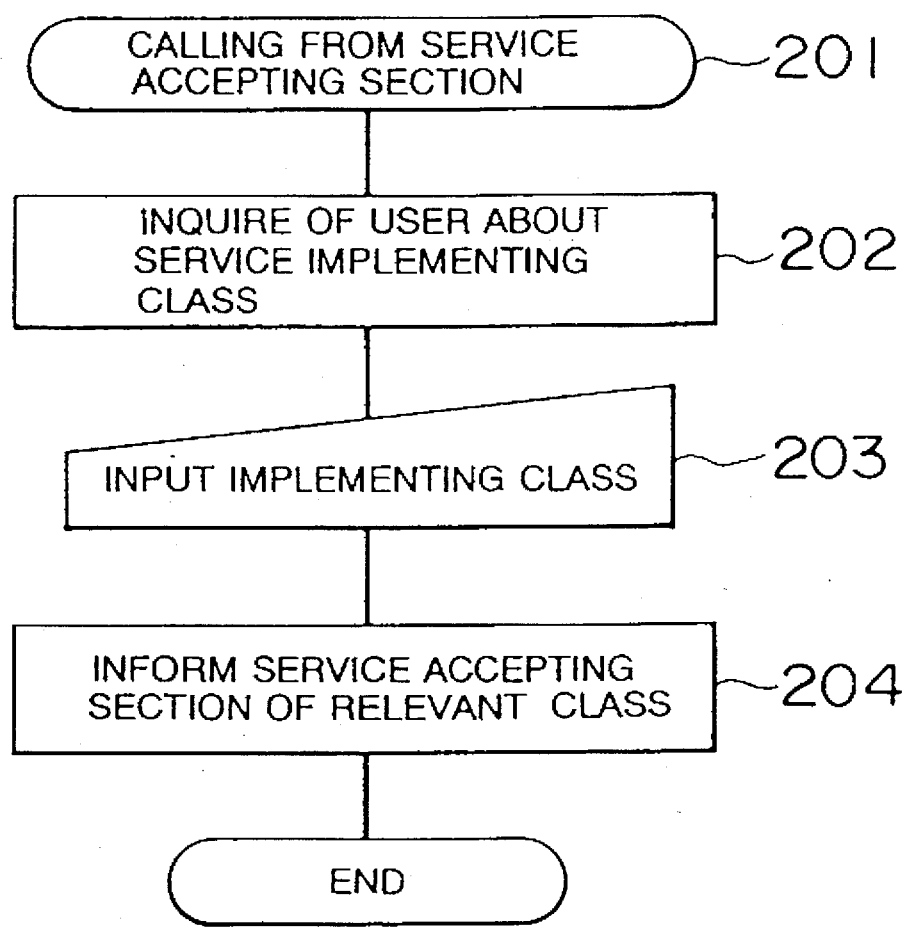
FIG. 9 is a flowchart showing actions of a class selecting section in accordance with the embodiment 2.

Next, the class selecting section 7 performs processing (step 62). FIG. 9 is a flowchart showing actions of the class selecting section in accordance with the embodiment 2. Referring to FIG. 9, the class selecting section 7, when called from the service accepting section 12, inquires of the user about a service implementing class (step 202).

Then, the class selecting section 7, when the user inputs the implementing class through an unillustrated keyboard (step 203), informs the service accepting section 12 of this implementing class (step 204). Further, the service accepting section 12 holds this class as a service implementing class.

Next, the service accepting section 12 obtaining the service implementing class requests the system checking section 9 to implement the service (step 64). Then, the system checking section 9 inquires of the allowable quantity holding section 11 about the system load data (step 66). Hereat, the allowable quantity holding section 11 carries out processing (step 68).

Figure 10:
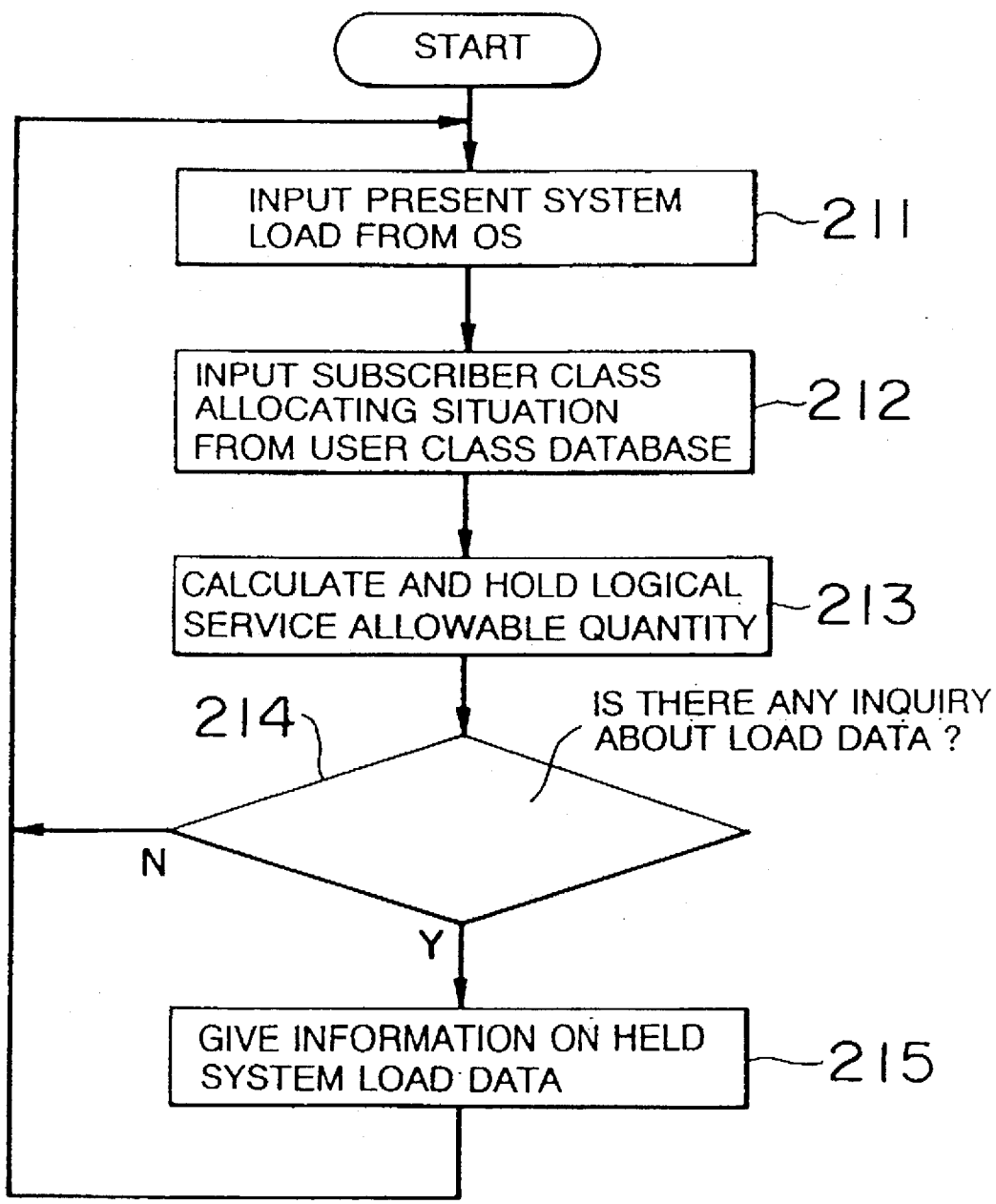
FIG. 10 is a flowchart showing actions of an allowable quantity holding section in accordance with the embodiment 2.

FIG. 10 is a flowchart showing actions of the allowable quantity holding section in accordance with the embodiment 2. Referring to FIG. 10, the allowable quantity holding section 11 obtains a present system load from the operating system 21 (step 211). The allowable quantity holding section 11 obtains a subscriber class allocating situation from the user database 6 (step 212).

Next, the allowable quantity holding section 11 calculates a logical service allowable quantity, i.e., a service acceptable standard on the basis of those items of data. The service allowable quantity is given by, e.g., the following formula:

$$\text{Service Allowable Quantity} = \text{Present System Load} + \frac{40\%}{\text{System Unoccupied Capacity}}$$

Subsequently, the allowable quantity holding section 11 holds a result of calculation as an item of system load data (step 213). The allowable quantity holding section 11 distinguishes whether or not there is an inquiry about the system load data (step 214).

If inquired about the system load data, the allowable quantity holding section 11 gives information of the held system load data (step 215), and the process returns to step 211. Further, whereas if not inquired about the system load data, the process goes back to step 211. Meanwhile, the system checking section 9 effects processing (step 70).

Figure 11:
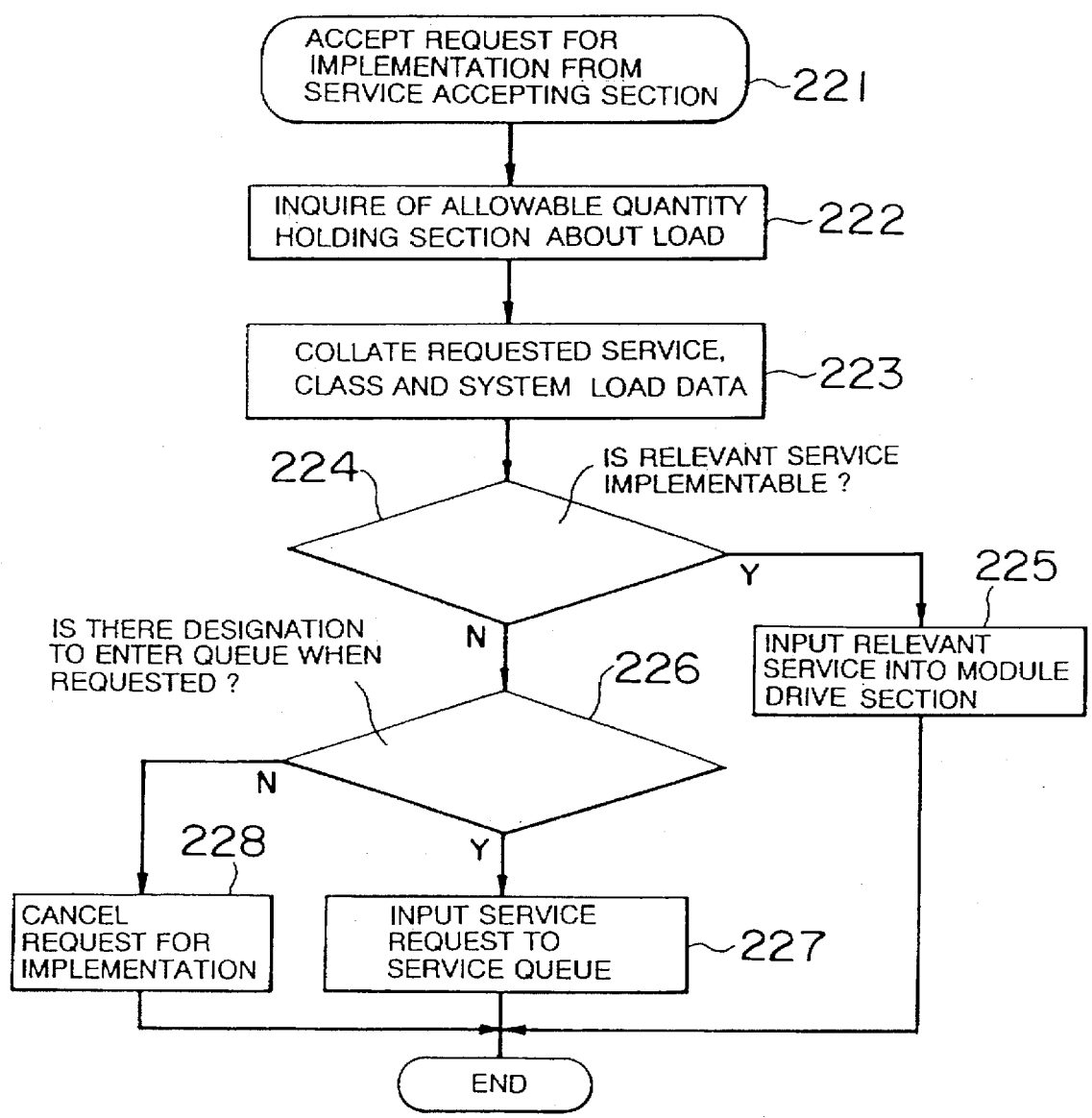
FIG. 11 is a flowchart showing actions of a system checking section.

FIG. 11 is a flowchart showing actions of the system checking section 9. Turning to FIG. 11, the system checking section 9 receives a request for implementing the service from the service accepting section 12 (step 221). The system checking section 9 then inquires of the allowable quantity holding section 11 about the system load data (step 222).

The system checking section 9 makes a collation between the requested service, the class and the system load data (step 223) and distinguishes whether this service is implementable or not (step 224).

Herein, if the service is implementable, the system checking section 9 inputs the service into the module drive section 1 (step 225), thus finishing the process.

Whereas if the service not implementable, the system checking section 9 distinguishes whether or not there is a designation to enter the service queue 10 when requesting the service (step 226). Herein, if designated to enter the service queue 10, the service request is inputted to the service queue 10 (step 227), thus finishing the process.

Whereas if not designated to enter the service queue 10, the service implementing request is canceled, thus finishing the process (step 228).

In this manner, the system checking section 9 obtains the present system load data before implementing the service. The system checking section 9 then estimates whether or not the system undergoes an overload due to the implementation of the service. The system checking section 9, when estimating that the system is brought into the overload, rejects the implementation of the service concerned and is thereby capable of keeping a minimum quality of the service.

Figure 12:
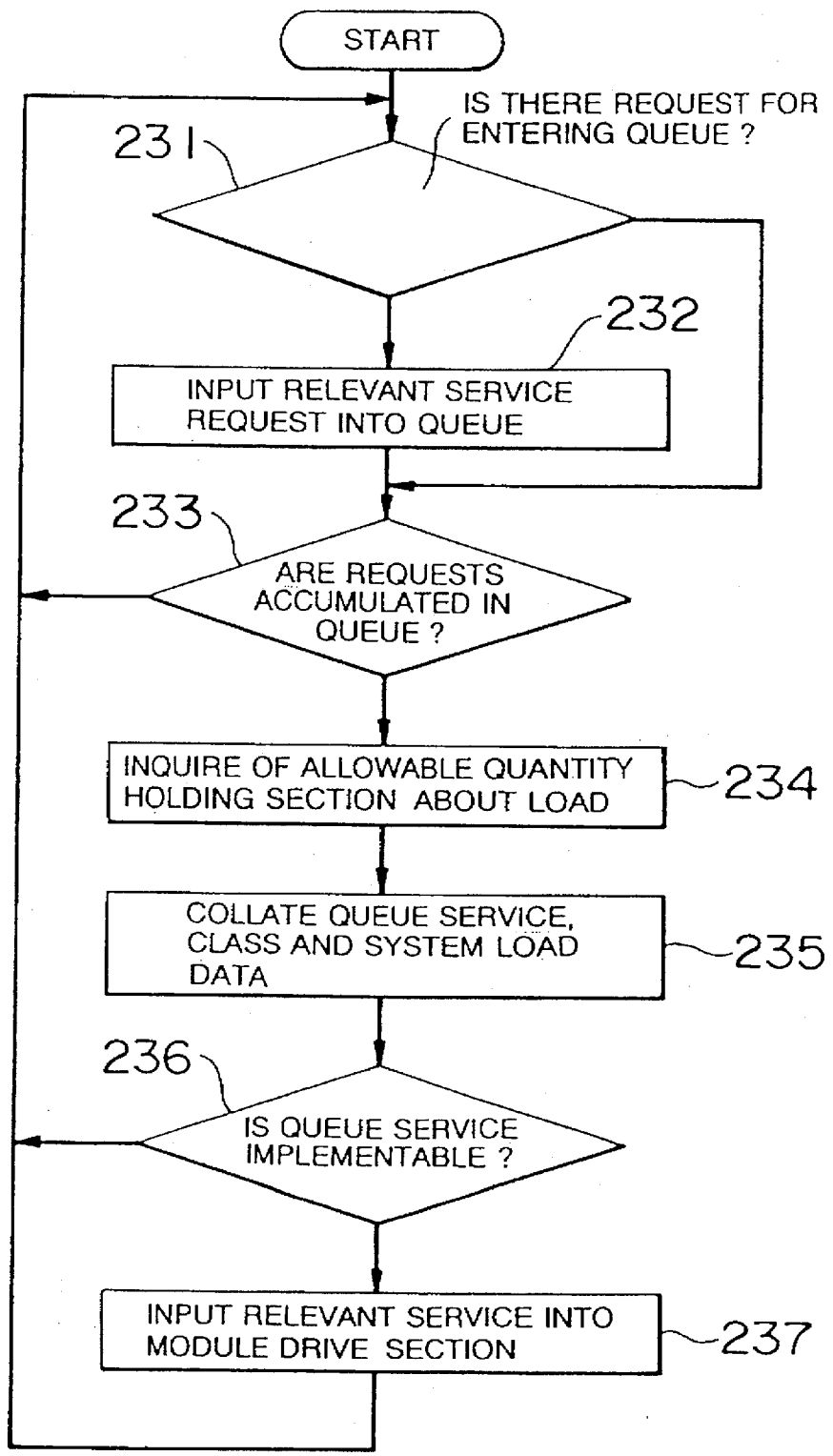
FIG. 12 is a flowchart showing actions of a service queue.

Next, the service queue 10 performs processing (step 72). FIG. 12 is a flowchart showing actions of the service queue. Referring to FIG. 12, the service queue 10 distinguishes whether or not there is a request for entering the queue (step 231). If not requested to enter the queue, the process proceeds to step 233.

Whereas if requested to enter the queue, the service queue 10 puts that service request into the queue (step 232) and distinguishes whether or not the service requests are accumulated in the queue step 233). If not accumulated in the queue, the process returns to the action of step 231.

Whereas if accumulated in the queue, the service queue 10 inquires of the allowable quantity holding section 11 about the system load data (step 234). The service queue 10 thus makes a collation between the service of the queue, the class and the system load data (step 235).

Next, the service queue 10 distinguishes whether the service of the queue is implementable or not (step 236). If the service of the queue is implementable, the service queue 10 inputs the service into the module drive section 1 (step 237), and the process returns to step 231. Whereas if not implementable, the process goes back to the action of step 231.

Figure 14:
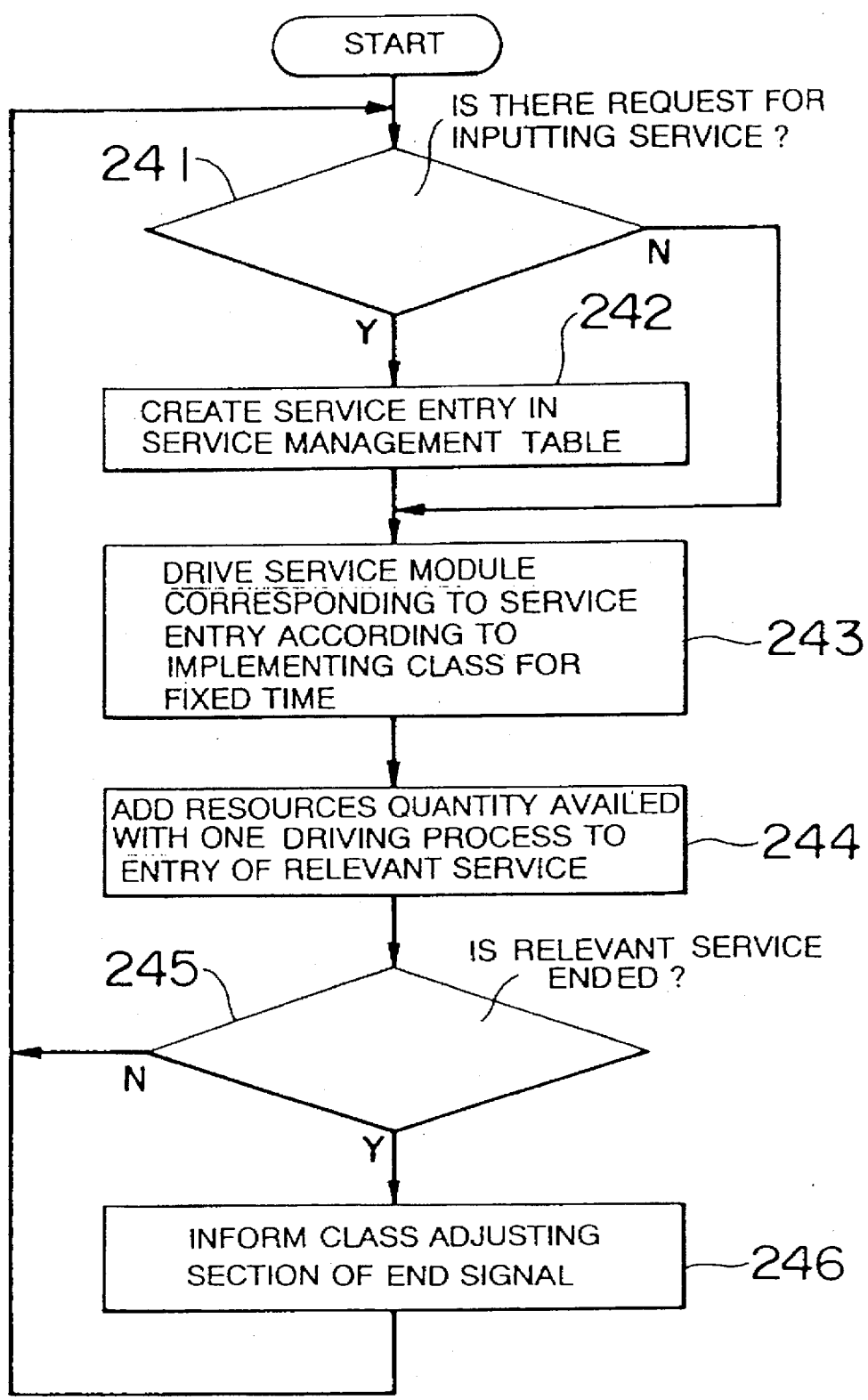
FIG. 14 is a flowchart showing actions of a module drive section in the embodiment 2.

Next, when putting the service into the module drive section 1, the module drive section 1 creates, as shown in FIG. 13, a service entry in the service management table 2. The module drive section 1 starts driving the service module 22 corresponding to the relevant service (step 74). FIG. 14 is a flowchart showing actions of the module drive section in the embodiment 2. Referring to FIG. 14, the module drive section 1 distinguishes whether there is a service input request or not (step 241). If there is no service input request, the process proceeds to step 243.

Whereas if there is a service input request, the module drive section 1 creates the service entry in the service management table 2 (step 242). Then, the module drive section 1 drives one service module corresponding to the service entry in the service management table 2 for a fixed period of time according to the implementing class (step 243).

Further, the module drive section 1 adds a resources availed quantity availed during one driving operation of the service module 22 to the service entry in the service management table 2 (step 244). The module drive section 1 then distinguishes whether or not that service is ended (step 245). Herein, if that service is not yet ended, the process returns to step 241.

A resources availing situation field is, as illustrated in FIG. 15, classified into a CPU time, a time from starting the service, a disk write capacity, a disk I/O quantity, a memory capacity, a line use quantity and an end status.

On the other hand, when the service concerned is ended, the module drive section 1 informs the class adjusting section 8 of a service identification number (ID) indicating an end-of-service signal (step 246), and the process goes back to step 241.

Figure 16:
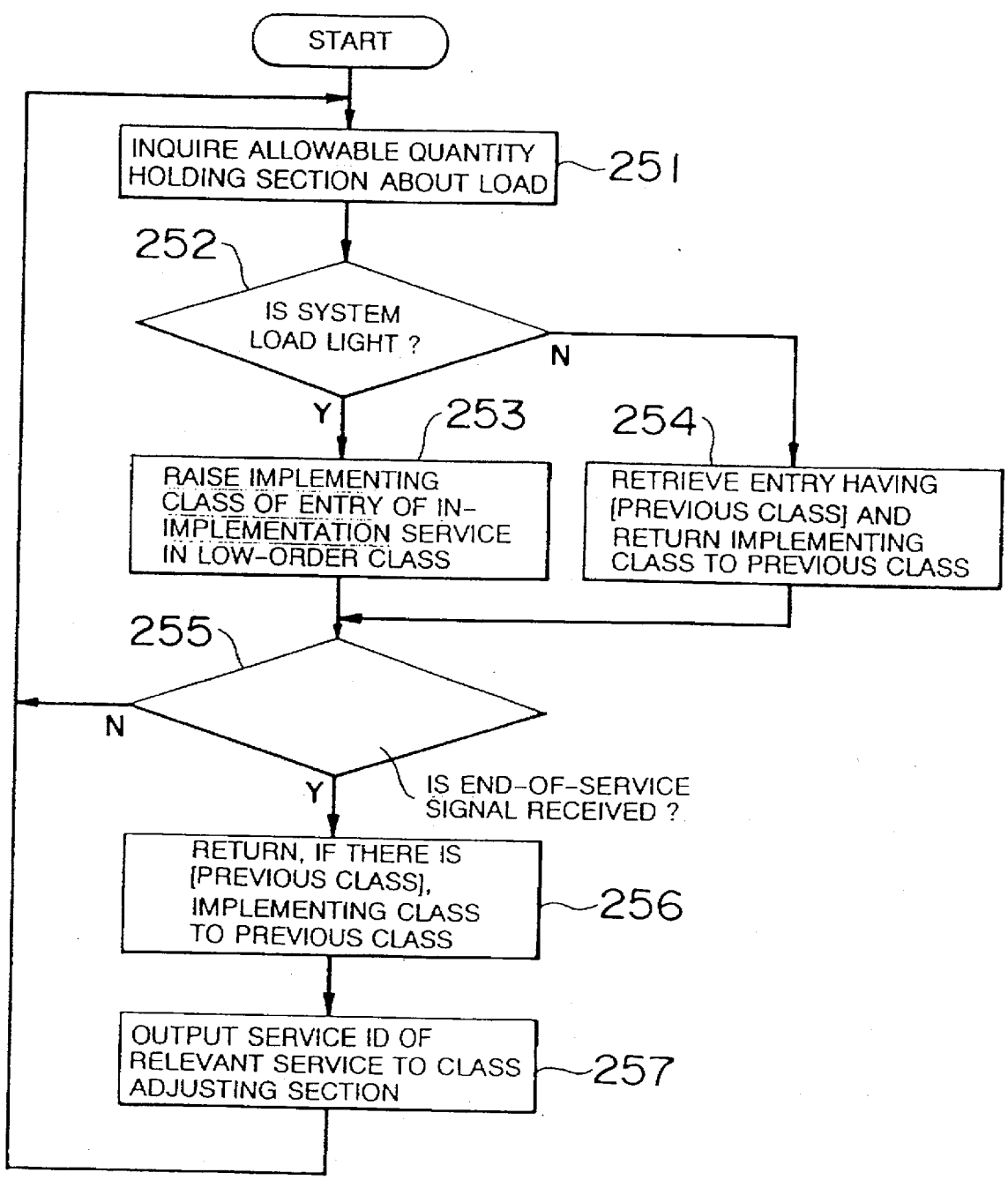
FIG. 16 is a flowchart showing actions of a class adjusting section.

Next, the class adjusting section 8 performs processing (step 76). FIG. 16 is a flowchart showing actions of the class adjusting section 8. Referring to FIG. 16, the class adjusting section 8 inquires the allowable quantity holding section 11 about the system load data (step 251). The class adjusting section 8 then distinguishes whether the system load is light or not (step 252).

If the system load is heavy, the class adjusting section 8 retrieves an entry having the previous class in the service management table 2 and returns the implementing class to the previous class (step 254). Then, the process proceeds to step 255.

Whereas if the system load is light, the class adjusting section 8 raises an implementing class of the service which is being implemented in a lower-order class in the service management table 2 (step 253). Then, the process proceeds to step 255.

Subsequently, the class adjusting section 8 distinguishes whether or not the end-of-service signal is received from the module drive section which is driving the service module 22 (step 255). When the end-of service signal is not received, the process goes back to step 251.

When the end-of-service signal is received, the class adjusting section 8 retrieves the service entry in the service management table 2. If there exists the previous class, the implementing class is returned to the previous class (step 256).

Further, a service ID of that service is transferred to the class adjusting section 8, and the accounting compensating section 5 is called (step 257). Then, the process returns to step 251.

In this manner, the class adjusting section 8 obtains the system load data and, when the load is light, retrieves the in-implementation service in the lower-order class from the service management table 2. Then, the class adjusting section 8 temporarily raises the implementing class of that service. The module drive section 1 temporarily increases the prescribed resources quantity allocated to the service according to the class concerned and is thereof capable of reducing futile unoccupied resources.

Next, the accounting compensating section 5 effects processing (step 78). The accounting compensating section 5 checks whether or not a result of implementing the service is matched with the level (quality) prescribed by the implementing class on the basis of the resources availed quantity and the implementing class existing in the service entry in the service management table 2. That is, the accounting compensating section 5 checks whether or not the resources availed quantity stored in the service management table 2 is matched with the prescribed resources quantity based on the implementing class.

If the resources availed quantity is not matched with the prescribed resources quantity based on the implementing class, the accounting compensating section 5 lowers the implementing class in the entry down to an implementing class corresponding to the prescribed resources quantity matched with the resources availed quantity. The accounting compensating section 5 has the prescribed resources quantities prescribed based on the respective classes in the form of a table to perform checking. This table is substantially the same as the charge table 15 shown in FIG. 4.

Figure 17:
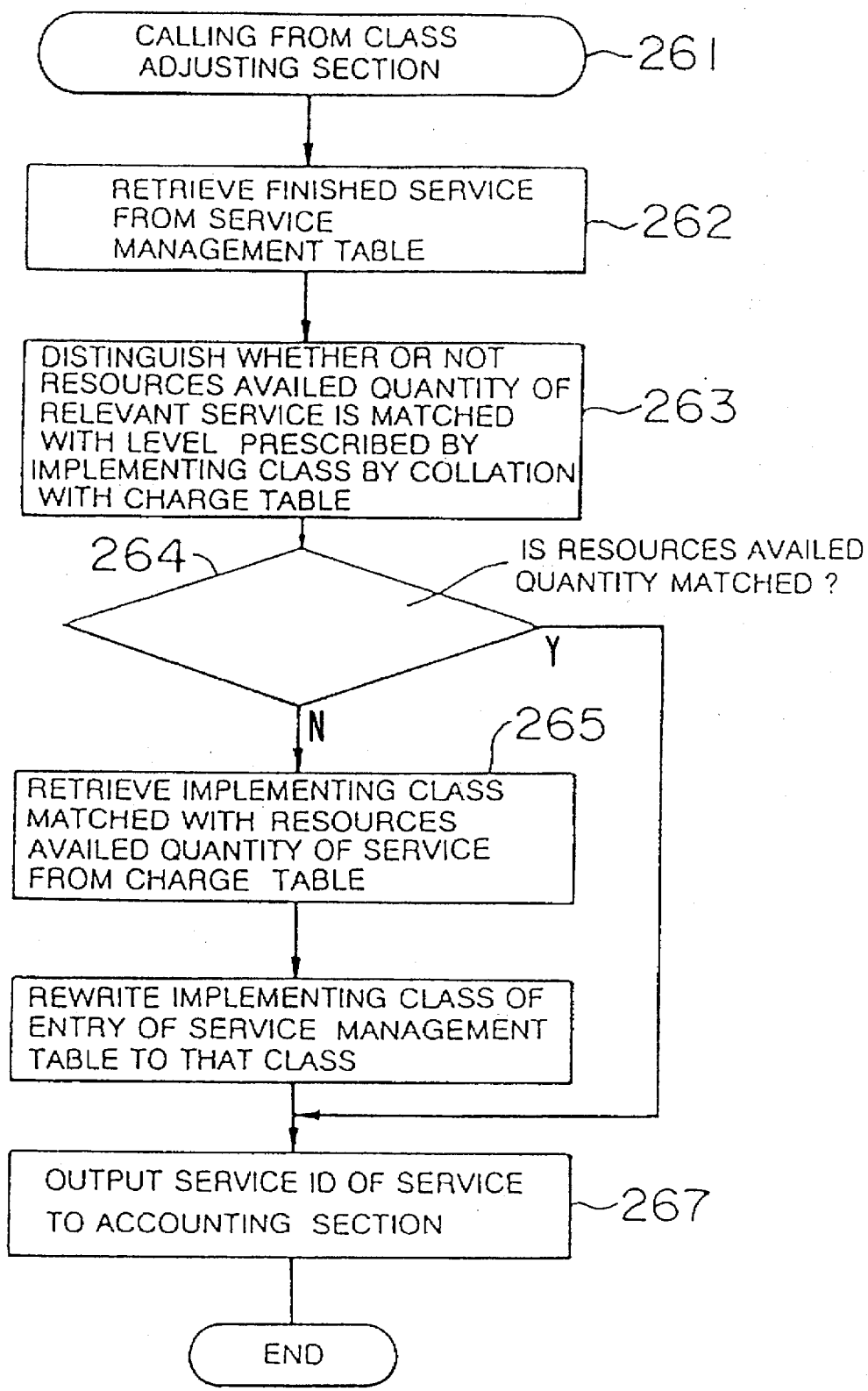
FIG. 17 is a flowchart showing actions of an according compensating section in the embodiment 2.

FIG. 17 is a flowchart showing actions of the accounting compensating section in the embodiment 2. Referring to FIG. 17, the accounting compensating section 5 is called from the class adjusting section 8 (step 261). An ended service, i.e., a transferred service ID is retrieved from the service management table 2 (step 262).

The accounting compensating section 5 distinguishes whether or not the resources availed quantity of the service is matched with the level prescribed by that implementing class. For this purpose, the accounting compensating section 5 collates the resources availed quantity with the charge table 15 shown in FIG. 4 (step 263). Then, the accounting compensating section 5 distinguishes whether or not the resources availed quantity is matched with the prescribed resources quantity based on the implementing class (step 264). If the resources availed quantity is matched with the prescribed resources quantity based on the implementing class, the process proceeds to step 267.

Whereas if not matched with the prescribed resources quantity based on the implementing class, the accounting compensating section 5 searches an implementing class corresponding to the prescribed resources quantity matched with the actual resources availed quantity of that service from the charge table 15 illustrated in FIG. 4 (step 265). Then, the accounting compensating section 5 rewrites the implementing class of the entry in the service management table 2 to the implementing class corresponding to the prescribed resources quantity matched with the resources availed quantity (step 266). Further, the service ID of that service is transferred to the accounting section 3 which is in turn called (step 267). For instance, when the service is the electronic mail transmission service, [Time from Start of Service] in the subitems of the resources availing situation shown in FIG. 13 is one of check items. This [Time from Start of Service] is compared with a mail reaching time shown in FIG. 4. After being checked, the accounting compensating section 5 calls the accounting section 3.

The accounting section 3 obtains the user's name, the implementing class and the resources availing situation from the service entry of the service management table 2. The accounting section 3 calculates an accounting quantity in accordance with, e.g., the following formula with reference to the charge table 15 shown in FIG. 4 (step 80).

Accounting Quantity = Relevant Service Implementing Class Basic Charge + {(Resources Availed Quantity × Unit Price) + ...}

Then, the accounting section 3 deletes the entry of that service from the service management table 2. The accounting section 3 adds and thus stores the calculated accounting quantity in the entry for the relevant user in the accounting database 4.

As discussed above, in accordance with the embodiment 2, the accounting ratio and the prescribed resources quantity that are allocated according to the service implementing classes can vary. It is therefore possible to offer the service corresponding to the level demanded by each user. Further, if the resources availed quantity is not matched with the prescribed resources quantity based on the implementing class, the accounting quantity is compensated, and, hence, a degree of satisfaction of the user can agree with the accounting quantity.

Moreover, it is possible to prevent the services from being excessively inputted over the system load and the futile unoccupied state of the system resources. Accordingly, the service offering system enhances the service quality and the service processing efficiency as well.

It is apparent that, in this invention, a wide range of different working modes can be formed based on the invention without deviating from the spirit and scope of the invention. This invention is not restricted by its specific working modes except being limited by the appended claims.

What is claimed is:

1. A service offering system for offering services in response to requests for services, comprising:

storage means, including a service management table, for storing a service implementing class and a resources availed quantity per service by making the service implementing class and the resources availed quantity correspond to each other;

module driving means for driving a service module corresponding to the service in accordance with the service implementing class in said service management table and for storing in said service management table the resources availed quantity determined by driving the service module;

accounting compensating means for checking whether the resources availed quantity stored in said service management table matches a prescribed resources quantity based on the service implementing class and, if the resources availed quantity does not match the prescribed resources quantity, for storing in said service management table compensation data for compensating an accounting quantity; and accounting means for calculating the accounting quantity based on the compensation data of the accounting quantity and the resources availed quantity stored in said service management table and, if the resources availed quantity does not match the prescribed resources quantity based on the service implementing class, for selecting an implementing class having a corresponding prescribed resources quantity matching the resources availed quantity and for storing the implementing class in said service management table.

2. The service offering system according to claim 1, wherein said module driving means creates service entries in said service management table, drives the service module corresponding to a service entry in accordance with the service implementing class and adds, to the service entry, the resources availed quantity determined by driving the service module.

3. The service offering system according to claim 1, further comprising class storage means including a user class database for holding a subscriber class for each service when a user becomes a subscriber.

4. The service offering system according to claim 3, further comprising:

pattern storage means including a class pattern table for holding some recommended patterns in which proper subscriber classes are allocated to respective services; and setting means for setting the subscriber class of each service by selecting any one of the recommended patterns held by said class pattern table.

5. The service offering system according to claim 3, further comprising change accepting means for accepting changes to a self-subscriber class on-line after the user has become the subscriber.

6. The service offering system according to claim 1, further comprising class selecting means for inquiring of the user about an implementing class for the service before implementing the service and selecting the service implementing class in accordance with a result of inquiring of the user per a service request.

7. The service offering system according to claim 1, further comprising class adjusting means for adjusting the service implementing class of the service which is being implemented depending on whether a system load is light or heavy.

8. The service offering system according to claim 1, further comprising system check means for checking whether the service is implementable by collating the service with system load data.

9. The service offering system according to claim 8, further comprising service queue means for inputting, if implementation of the service is rejected, the service into said module driving means when there is some unoccupied capacity in the system load by putting a service request into a queue.

10. The service offering system according to claim 9, further comprising:

allowable quantity holding means for calculating and holding a service allowable quantity based on of present system load data and a subscriber class allocating situation; and class adjusting means for enabling an implementation of the service based on the service allowable quantity held by said allowable quantity holding means and adjusting a class of the service which is being implemented.

11. A service offering method of offering services in response to requests for services, comprising:

(a) storing in a service management table a service implementing class and a resources availed quantity per service by selecting the service implementing class to correspond to the resources availed quantity;

(b) driving a service module corresponding to the service in accordance with the service implementing class in said service management table;

(c) storing said service management table the resources availed quantity determined by driving the service module in step (b);

(d) compensating accounting by checking whether the stored resources availed quantity matches a prescribed resources quantity based on the service implementing class and, if the resources availed quantity does not match the prescribed resources quantity, storing in said service management table compensation data for compensating an accounting quantity, selecting an implementing class having a corresponding prescribed resources quantity matching the resources availed quantity, and storing the implementing class in said service management table; and (e) calculating the accounting quantity based on the compensation data of the accounting quantity and the resources availed quantity stored in step (a).

12. The service offering method according to claim 11, wherein said driving in step (b) comprises the substeps of:

(b1) creating service entries in said service management table;

(b2) driving the service module corresponding to the service entry in accordance with the service implementing class; and (b3) adding, to the service entry, the resources availed quantity determined by said driving of the service module in step (b2).

13. The service offering method according to claim 11, further comprising the step of (f) storing a subscriber class for each service when a user becomes a subscriber.

14. The service offering method according to claim 13, further comprising the steps of:

(g) storing recommended patterns in which proper subscriber classes are allocated to respective services; and (h) setting the subscriber class of each service by selecting any one of the recommend patterns.

15. The service offering method according to claim 13, further comprising the step of (g) accepting a self-subscriber class on-line after the user has become the subscriber.

16. The service offering method according to claim 11, further comprising the steps of (f) inquiring of the user about an implementing class for the service before implementing the service; and (g) selecting the service implementing class in accordance with a result of inquiring of the user per a service request.

17. The service offering method according to claim 11, further comprising the step of (f) adjusting the service implementing class of the service which is being implemented depending on whether a system load is light or heavy.

18. The service offering method according to claim 11, further comprising the step of (f) checking whether the service is implementable by collating the service with system load data.

19. The service offering method according to claim 18, further comprising the step of (g) reinitiating said driving step (b), if implementation of the service is rejected, when there is some unoccupied capacity in the system load, by putting a service request into a queue.

20. The service offering method according to claim 19, further comprising the steps of:

(h) calculating and holding a service allowable quantity based on present system load data and a subscriber class allocating situation; and (i) enabling an implementation of the service based on the service allowable quantity with adjustment of a class of the service which is being implemented.

* * * * *